US009914140B2

(12) United States Patent
Yu

(10) Patent No.: US 9,914,140 B2
(45) Date of Patent: Mar. 13, 2018

(54) WATER SPRINKLER

(71) Applicant: ZhongShan QingYi Metal Products Enterprise Co. Ltd, ZhongShan, Guangdong Province (CN)

(72) Inventor: Tang Chieh Yu, Taichung (TW)

(73) Assignee: Zhongshan Qingyi Metal Products Enterprise Co., Ltd., Zhongshan (CN)

( * ) Notice: Subject to any disclaimer, the term of this patent is extended or adjusted under 35 U.S.C. 154(b) by 116 days.

(21) Appl. No.: 15/074,771

(22) Filed: Mar. 18, 2016

(65) Prior Publication Data

US 2017/0266673 A1 Sep. 21, 2017

(51) Int. Cl.

| | |
|---|---|
| ***B05B 3/04*** | (2006.01) |
| ***B05B 12/00*** | (2018.01) |
| *A01G 25/00* | (2006.01) |

(52) U.S. Cl.

CPC .......... *B05B 3/0472* (2013.01); *B05B 3/0445* (2013.01); *B05B 3/0481* (2013.01); *B05B 12/002* (2013.01); *A01G 25/00* (2013.01)

(58) Field of Classification Search

CPC ... B05B 3/0445; B05B 3/0472; B05B 3/0481; B05B 12/002; B05B 3/0454; B05B 15/066; Y10S 239/01

USPC .... 239/222.11, 222.13, 222.15, 222.17, 227, 239/230–233, DIG. 1

See application file for complete search history.

(56) References Cited

U.S. PATENT DOCUMENTS

| | | | | | |
|---|---|---|---|---|---|
| 3,878,990 | A * | 4/1975 | Geraudie | B05B 3/0454 | 239/236 |
| 4,632,312 | A * | 12/1986 | Premo | B05B 3/0472 | 185/45 |
| 4,978,070 | A * | 12/1990 | Chow | B05B 3/0472 | 239/230 |
| 4,984,740 | A * | 1/1991 | Hodge | B05B 3/0454 | 239/232 |
| 5,392,990 | A * | 2/1995 | Iwata | A62C 31/05 | 239/232 |
| 7,014,125 | B2 * | 3/2006 | Lerner | B05B 3/021 | 239/222.11 |

* cited by examiner

*Primary Examiner* — Alexander Valvis
(74) *Attorney, Agent, or Firm* — C. G. Mersereau; Nikolai & Mersereau, P.A.

(57) ABSTRACT

A water sprinkler includes a housing and an ejection head. An impeller is assembled in the housing, pushed by water, and connected to a cam. A water-hit target is pivoted with the housing via a compression spring, and an impacted portion of the water-hit target is extending outside of the housing. The water-hit target repeatedly impacts the housing because of the pivoting motion caused by the pushing of water flow and by the pulling of the compression spring, so that the housing is pivoted to change the ejection direction of the ejection head. A water baffling cover is pivoted with the housing. A abutted member is assembled on the water baffling cover and abutted against the cam. The cam can push the abutted member to drive the pivoting motion of the water baffling cover, so that the water baffling cover shields the ejection head by different extents.

7 Claims, 11 Drawing Sheets

WATER SPRINKLER

BACKGROUND OF THE INVENTION

Field of the Invention

The present invention relates to a water sprinklerr, in particular to a water sprinklerr capable of providing an automatic water sprinkling function within a certain region.

Description of the Prior Art

To the maintenance of a large area lawn, the supervisor commonly uses an automatic water sprinklerr to watering the grasses. A conventional water sprinklerr ejects water by a constant pressure so that the conventional water sprinklerr ejects a water beam by a certain ejection distance; and the conventional water sprinklerr is further provided with a pivoting member, the pivoting member is repeatedly pivoted back and forth to shield the water beam ejected from the water sprinkler. Hence, the water beam ejected from the water sprinklerr spreads over a certain region to moisturize the grasses within the region. However, the sprinkling region of the conventional water sprinklerr is insufficient.

Therefore, a modified water sprinklerr is provided to solve the aforementioned problem. One end of the ejection head of the modified water sprinklerr is moved along a rail, so that the ejection head can perform a periodical pivoting motion and allow the ejection distance of the water beam ejected from the modified water sprinklerr to be changed. In conjunction with the aforementioned pivoting member, the sprinkling range of water spread from modified water sprinklerr can be enlarged. However, the pivoting member has to move along with the movement of the ejection head to shield the water beam ejected from the ejection head; while the pivoting member pivots reciprocatingly itself. Therefore, the whole structure of the modified water sprinkler is quite complicated, and it is hard to adjust the sprinkling range of the water sprinkler having such complicated structure.

SUMMARY OF THE INVENTION

One object of the present invention is to provide a water sprinkler. The water sprinkler is capable of providing different sprinkling ranges and different ejection distances according to various requirements, so that a user can use the water sprinkler conveniently.

To achieve the above and other objects, a water sprinkler comprises a housing, an impeller, a water-hit target, and a water baffling cover. The housing comprises an inflow pipe for guiding water into the housing and an ejection head for ejecting water. The impeller is assembled in the housing and corresponds to the inflow pipe. The impeller is rotated by the pushing of water. The impeller is connected to a driving mechanism, and the driving mechanism is connected to a cam. The water-hit target is pivoted with the housing. The water-hit target is connected to the housing via a compression spring. The water-hit target comprises an impacted portion extending out of the ejection head. When the impacted portion is impacted by water, the water-hit target is pivoted with respect to the housing along a first direction, while when the water-hit target is pulled by the compression spring, the water-hit target is pivoted with respect to the housing along a second direction opposite to the first direction, so that the housing is pivoted to change the ejection direction of the ejection head. The water baffling cover is pivoted with the housing by a pivoting portion. The water baffling cover comprises a shield portion extending in front of the ejection head. The water baffling cover comprises a abutted member abutted against the cam. The rotation of the cam pushes the abutted member to drive the water baffling cover to pivot with respect to the housing, so that the shielded area of the ejection head shielded by the shield portion is changed.

In one embodiment, an elongate groove is opened on the water baffling cover. The abutted member comprises a controlling portion extending into the elongate groove. The controlling portion is controlled to move along elongate groove to drive the abutted member, so that the relative position between the abutted member and the cam is adjusted.

Furthermore, one side of the elongate groove has a rack. The controlling portion is a rotatable knob, and a pinion is extending from the knob to engage with the rack.

In one embodiment, the water baffling cover comprises a movable pushing block abutted against an abutting surface of the housing. The abutting surface is not parallel with the surface of the water baffling cover. The abutting surface is defined to have a first end and a second end. The distance between the first end and the water baffling cover is greater than the distance between the second end and the water baffling cover. The pushing block is movable between the first end and the second end.

In one embodiment, the housing is divided into a first room, a second room, and a third room by a first partition wall and a second partition wall. The first partition wall has a first opening, and the first room communicates with the third room via the first opening. The second partition wall has a second opening, and the second room communicates with the third room via the second opening. A baffling plate is assembled in the third room and corresponds to the second opening. A connecting bar of the baffling plate is extending from the second room, through the second partition wall, and into the third room. A spring is fitted over the connecting bar in the second room. The housing comprises a first water inlet and a second water inlet. The first water inlet and the second water inlet correspond to the inflow pipe. The first water inlet communicates with the first room, and the second water inlet communicates with the second room.

DETAILED DESCRIPTION OF THE PREFERRED EMBODIMENTS

Figure 1:
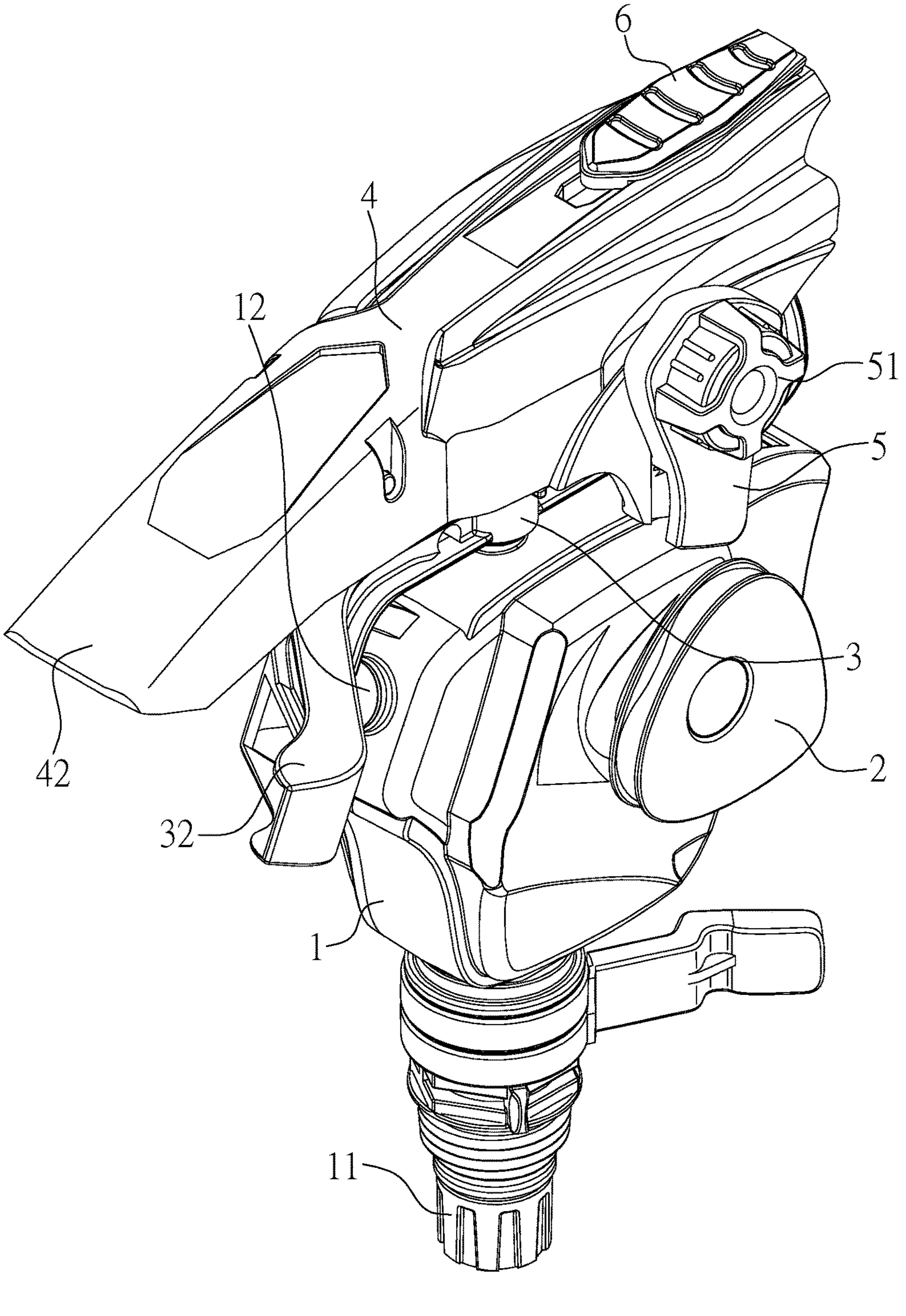
FIG. 1 illustrates a perspective view of a water sprinkler according to an exemplary embodiment of the present invention.
Figure 2:
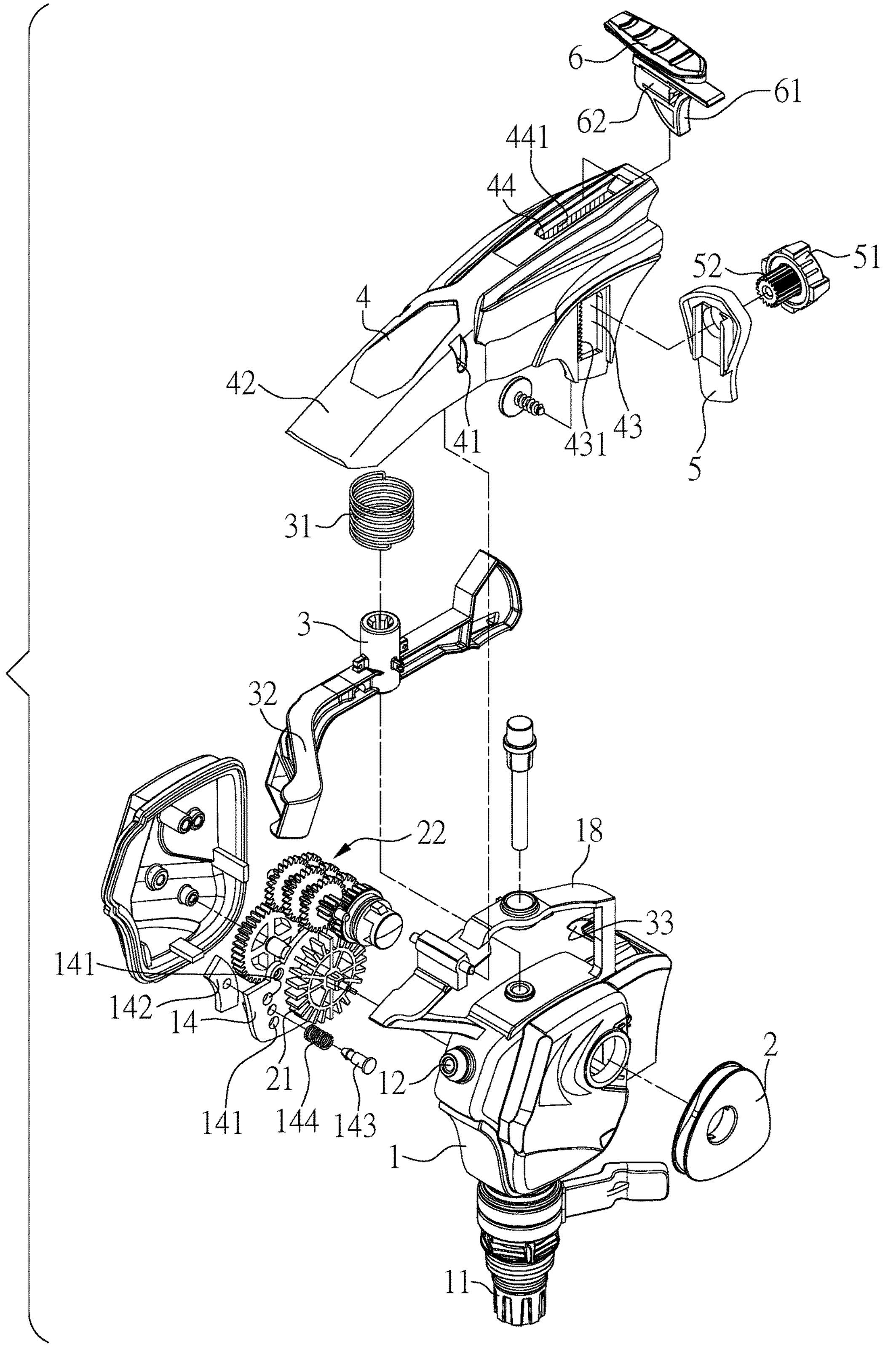
FIG. 2 illustrates an exploded view of the water sprinkler.
Figure 3:
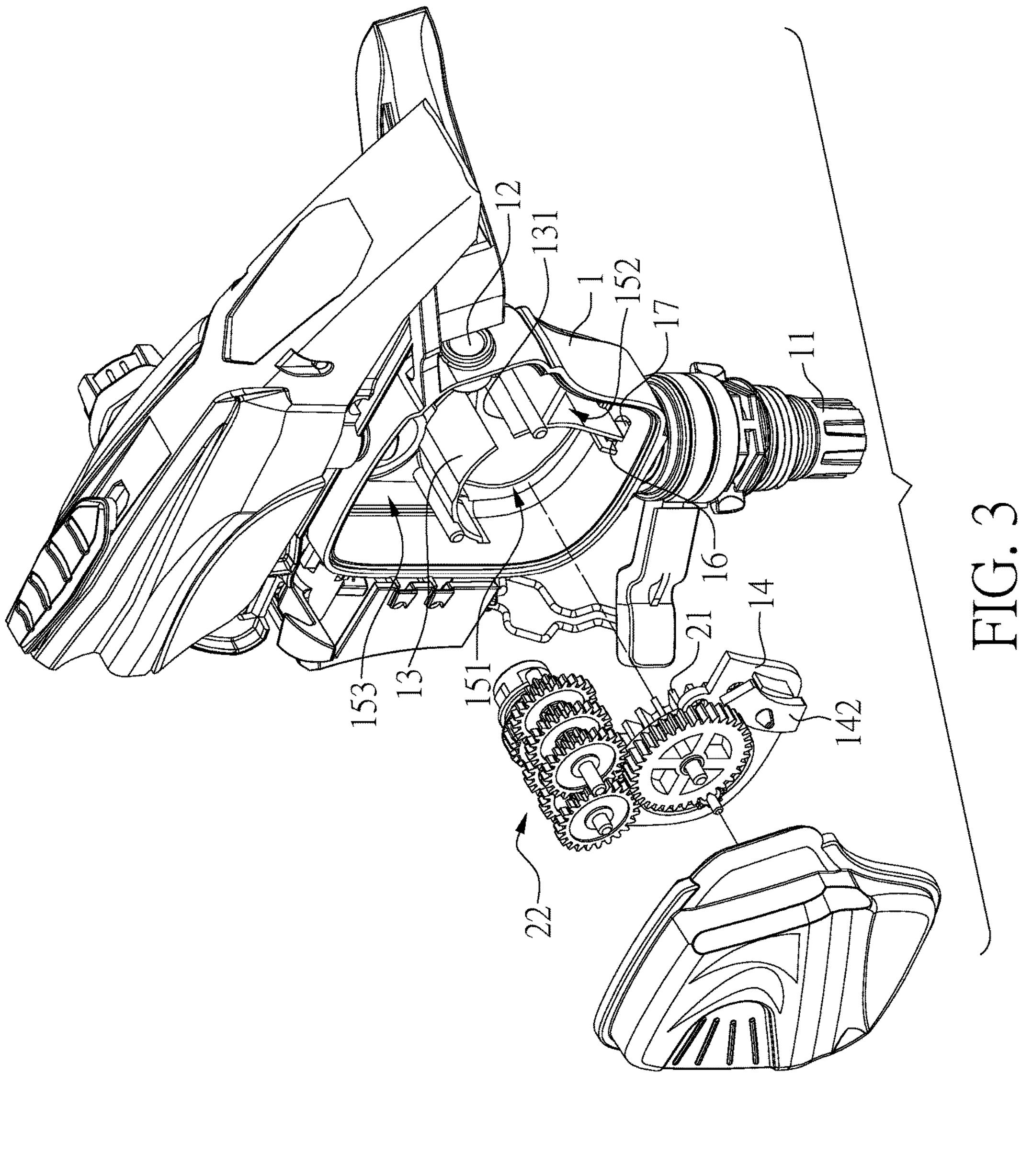
FIG. 3 illustrates a partial exploded view showing components in a housing of the water sprinkler.
Figure 4:
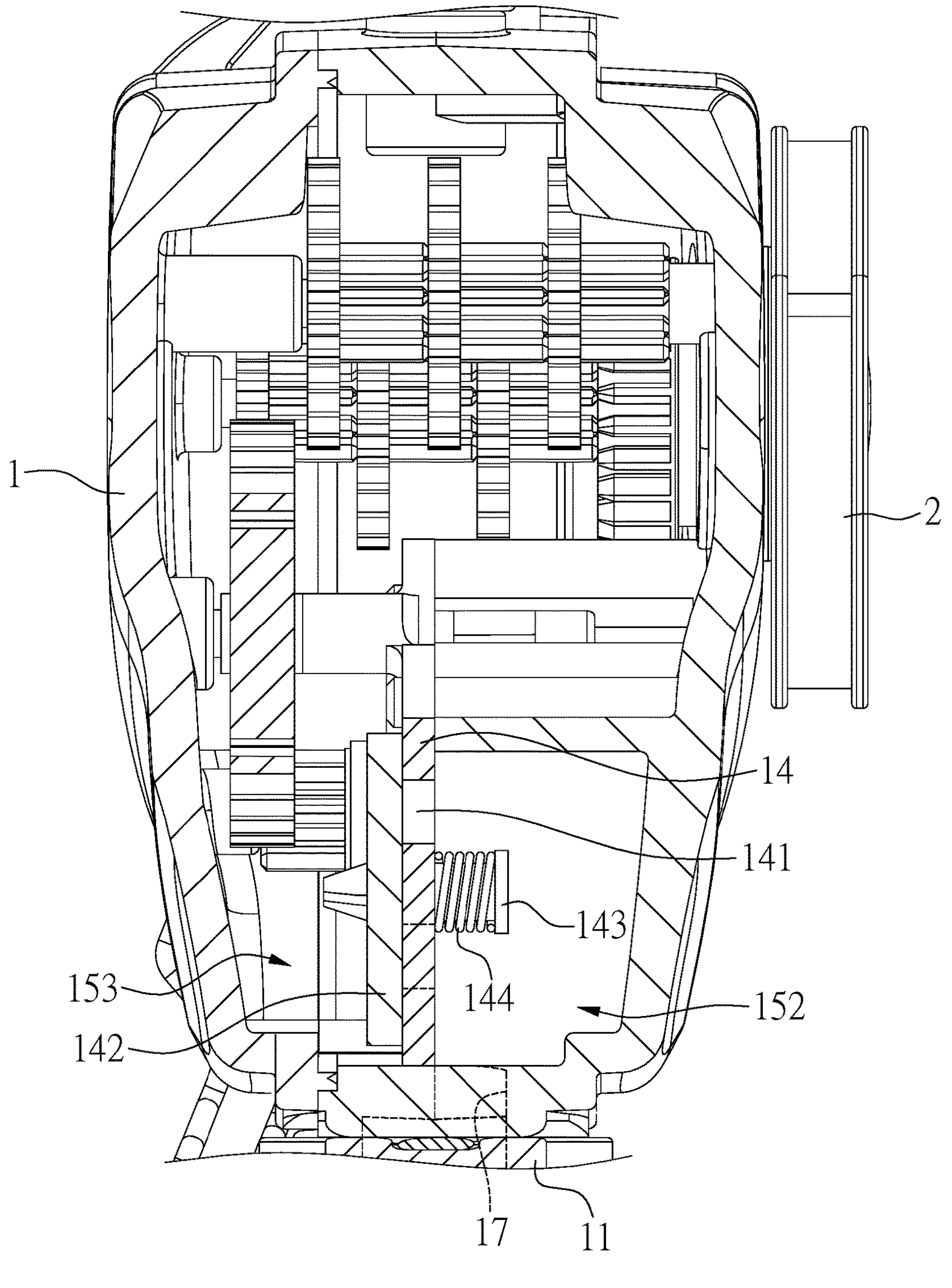
FIGS. 4 and 5 illustrate schematic sectional views showing a baffling plate of the water sprinkler is pushed against water flow.

Please refer to FIGS. 1 to 3, which illustrate a water sprinkler according to an exemplary embodiment of the present invention. The water sprinkler comprises a housing 1. The housing 1 defines a space therein and comprises an inflow pipe 11 for guiding water into the housing 1 and an ejection head 12 for ejecting water. A first partition wall 13 and a second partition wall 14 are assembled in the housing 1 to divide the space into a first room 151, a second room 152, and third room 153. The first partition wall 13 has a first opening 131, and the first room 151 communicates with the third room 153 via the first opening 131. The second partition wall 14 has a second opening 141, and the second room 152 communicates with the third room 153 via the second opening 141. A baffling plate 142 is assembled in the third room 153 and corresponds to the second opening 141. As shown in FIG. 4, a connecting bar 143 of the baffling plate 142 is extending from the second room 152, through the second partition wall 14, and into the third room 153. In addition, a spring 144 is fitted over the connecting bar 143 in the second room 152, so that the connecting bar 143 and the baffling plate 142 are pulled by the elastic force of the spring 144, and the baffling plate 142 is abutted against the second partition wall 14 normally and shields the second opening 141. In addition, the housing 1 has a first water inlet 16 and a second water inlet 17. The first water inlet 16 and the second water inlet 17 correspond to the inflow pipe 11. The first water inlet 16 communicates with the first room 151, and the second water inlet 17 communicates with the second room 152. Hence, water is injected into the housing 1 from the inflow pipe 11 and enters into the first room 151 and the second room 152 via the first water inlet 16 and the second water inlet 17, respectively.

An impeller 21 is assembled in the first room 151 and corresponds to the first water inlet 16. After water in the inflow pipe 11 flows into the first room 151 via the first water inlet 16, water drives the impeller 21 to rotate. The impeller 21 is further connected to a driving mechanism 22, and the driving mechanism 22 is connected to a cam 2. Hence, the cam 2 is rotated by the driving of the impeller 21. In this embodiment, the cam 2 is assembled out of the housing 1, and the driving mechanism 22 comprises a plurality of driving gears engaged with each other. Therefore, the driving mechanism 22 transmits the motion of the impeller 21 to drive the cam 2 to rotate.

On the other hand, after water in the inflow pipe 11 flows into the second room 152 via the second water inlet 17, water may, depending on the pressure of water flow, push the baffling plate 142 away and flow into the third room 153 via the second opening 141. The value of the pressure capable of pushing the baffling plate 142 away is determined by the elastic coefficient of the spring 144. When the pressure of water in the inflow pipe 11 is rather lower, as shown in FIG. 4, the baffling plate 142 is held by the spring 144 and cannot be pushed away after water flows into the second room 152. Therefore, the second opening 152 remains shielded by the baffling plate 142. Then, when the second room 152 is full of water, water in the inflow pipe 11 cannot be poured into the second room 152, and all the water in the inflow pipe 11 will be poured into the first room 151 to push the impeller 21.

Figure 5:
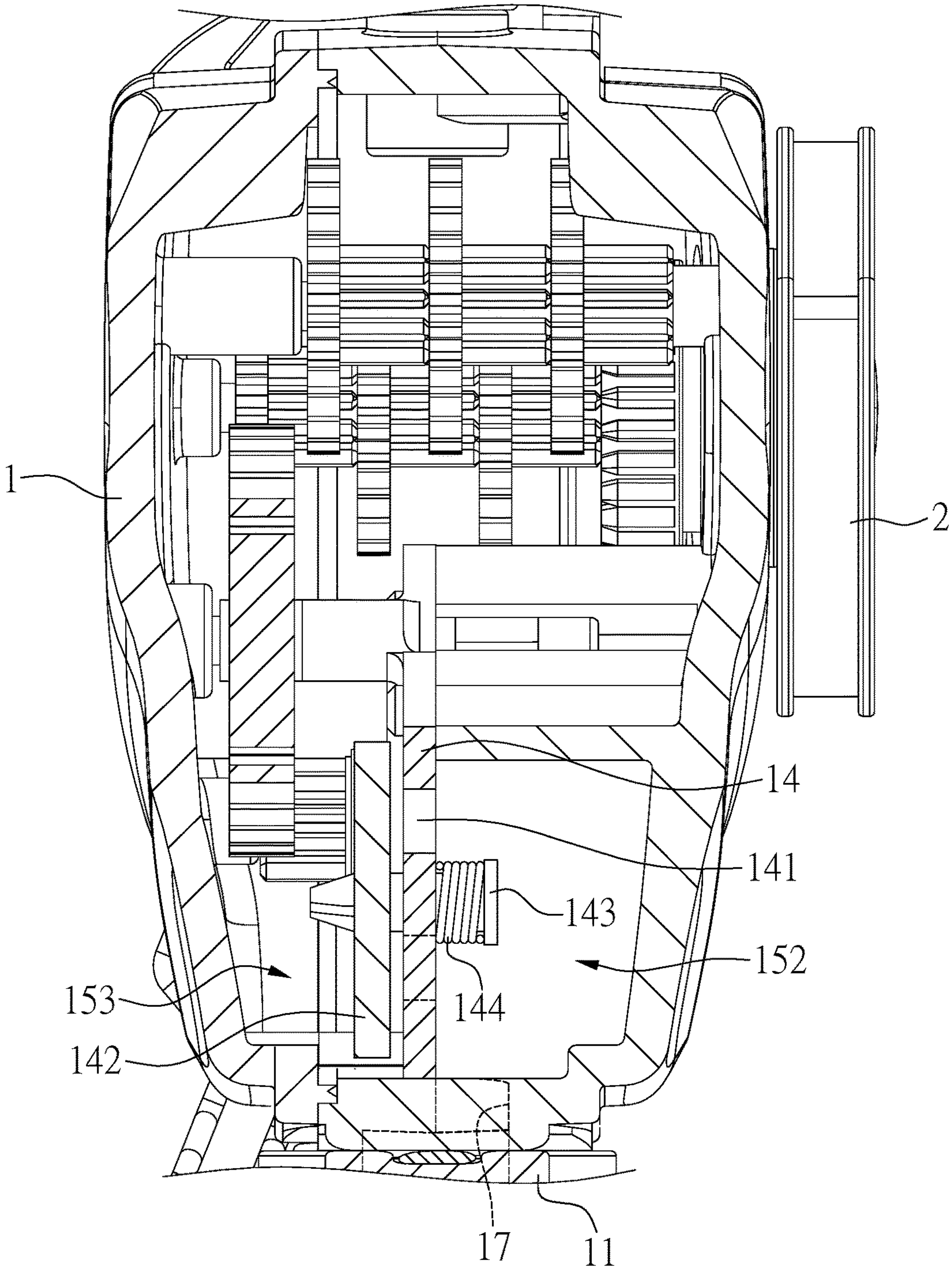

Conversely, when the pressure of water in the inflow pipe 11 is rather higher, as shown in FIG. 5, the baffling plate 142 is pushed away, and water can continuously enter into the third room 153 via the second opening 141. Hence, water flow in the inflow pipe 11 is divided into a flow toward the first room 151 and a flow toward the second room 152, and water in the inflow pipe 11 to be poured into the first room 151 provide a suitable pressure, so that the impeller 21 in the first room 151 is pushed properly, and the rotation speed of the impeller 21 would not be too fast.

Accordingly, when the pressure of water in the inflow pipe 11 is rather lower, water in the inflow pipe 11 enters into the third room 153 via the first room 151 and the first opening 131 and is ejected from the ejection head 12. While when the pressure of water in the inflow pipe 11 is rather higher, water in the inflow pipe 11 flows into the first room 151 and the second room 152, and respectively passes through the first opening 131 and the second opening 141 to enter into the third room 153, and then ejected from the ejection head 12.

As shown in FIGS. 1 and 2, a water-hit target 3 is pivoted with the top of the housing 1, and the water-hit target 3 is connected to the housing 1 via a compression spring 31. The water-hit target 3 comprises an impacted portion 32 extending out of the ejection head 12. When the impacted portion 32 of the water-hit target 3 is impacted by water ejected from the ejection head 12, the water-hit target 3 is pivoted with respect to the housing 1 along a determined positive direction. Next, the compression spring 31 pulls the water-hit target 3 and the water-hit target 3 is pivoted with respect to the housing 1 along a reverse direction, and the impacted portion 32 impacts the housing 1. Hence, the housing 1 is impacted and pivoted about one direction to change the ejection direction of the ejection head 12.

In addition, the housing 1 comprises a blocking member 33. The block member 33 can be controlled and extending into the pivoting range of the water-hit target 3. After the blocking member 33 extends into the pivoting range of the water-hit target 3, the water-hit target 3 impacts the blocking member 33. Therefore, the housing 1 is pivoted about a opposite direction to allow the reverse ejection direction of the ejection head 12.

Figure 6:
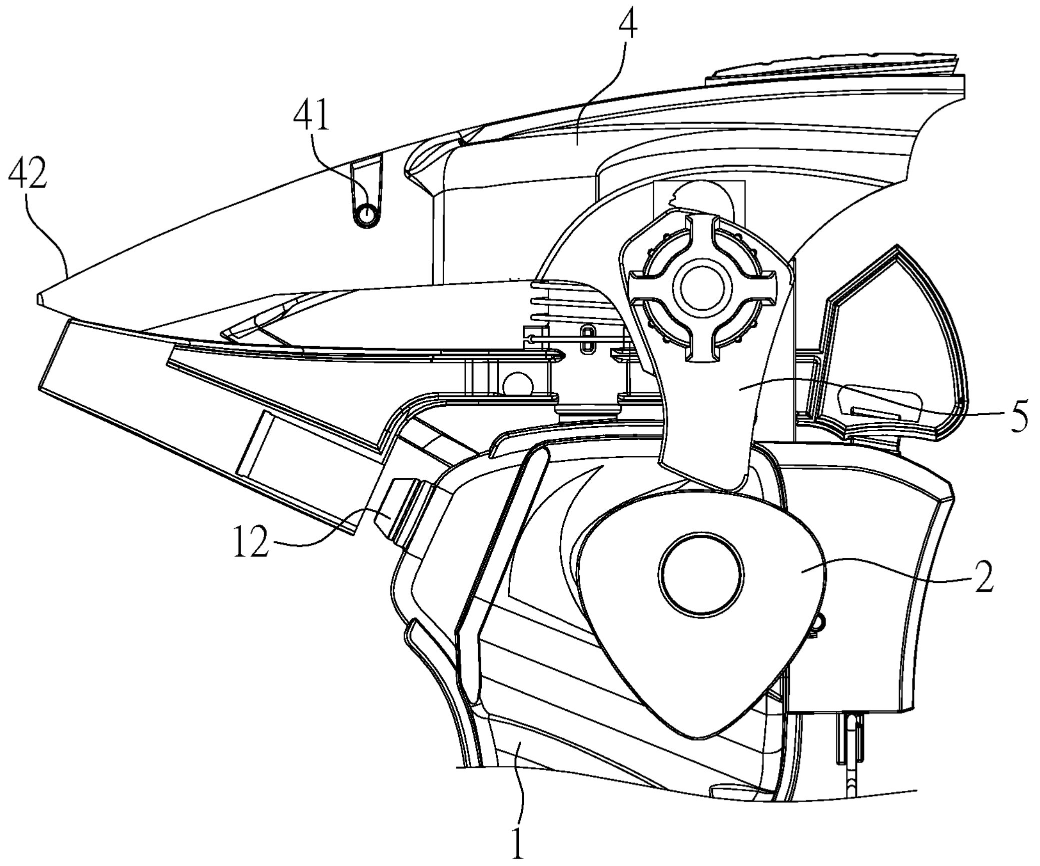
FIGS. 6 and 7 illustrate schematic operational views showing rotations of a cam of the water sprinkler.
Figure 7:
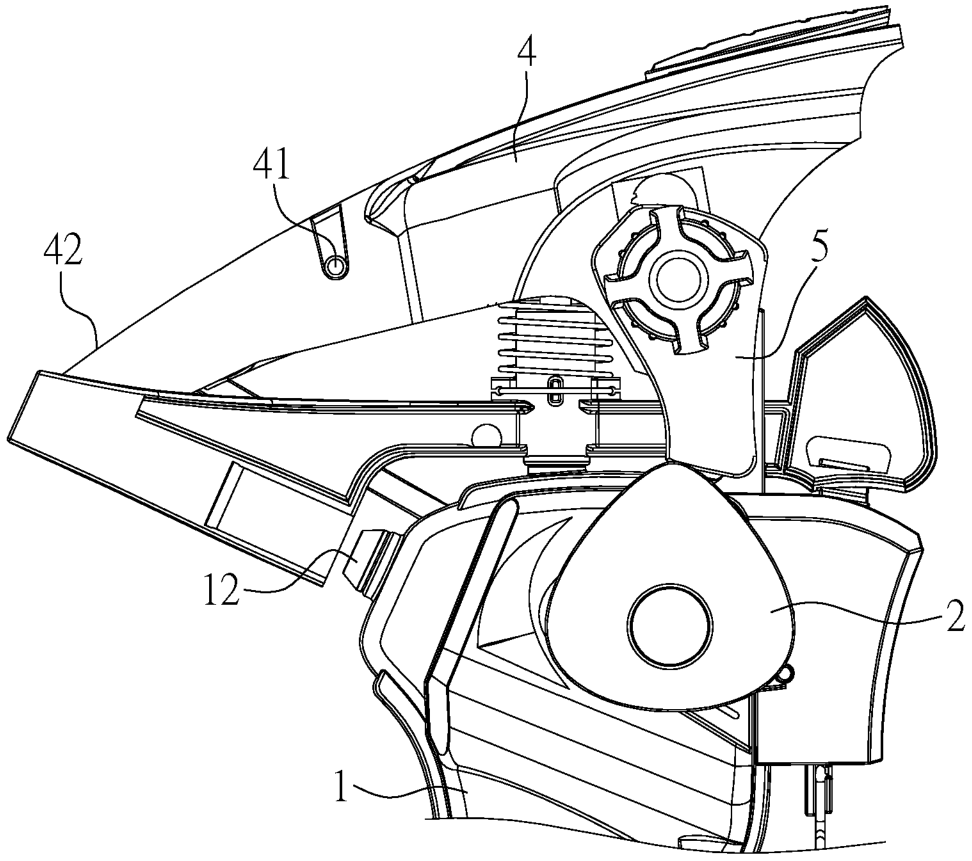

The water sprinkler further comprises a water baffling cover 4 and a abutted member 5 for changing the sprinkling range of the water sprinkler. As shown in FIGS. 2 and 6, the water baffling cover 4 is pivoted with the housing 1 by a pivoting portion 41 and the water baffling cover 4 comprises a shield portion 42 in front of the ejection head 12. The abutted member 5 is assembled with the water baffling cover 4. The abutted member 5 can be abutted against the cam 2. When the cam 2 is driven by the impeller 21 to rotate, as shown in FIGS. 6 and 7, the cam 2 further drives the abutted member 5 to perform a reciprocatingly up-and-down motion, and the abutted member 5 pushes the water baffling cover 4 to pivot about the pivoting portion 41 to perform a reciprocating motion. Moreover, during the reciprocating motion of the water baffling cover 4, the shield portion 42 shields the ejection head 12 by different extents. Hence, water ejected from the ejection head 12 is shielded by the shield portion 42 with different sized areas, and the ejection distance of the ejection head 12 can be changed.

Figure 8:
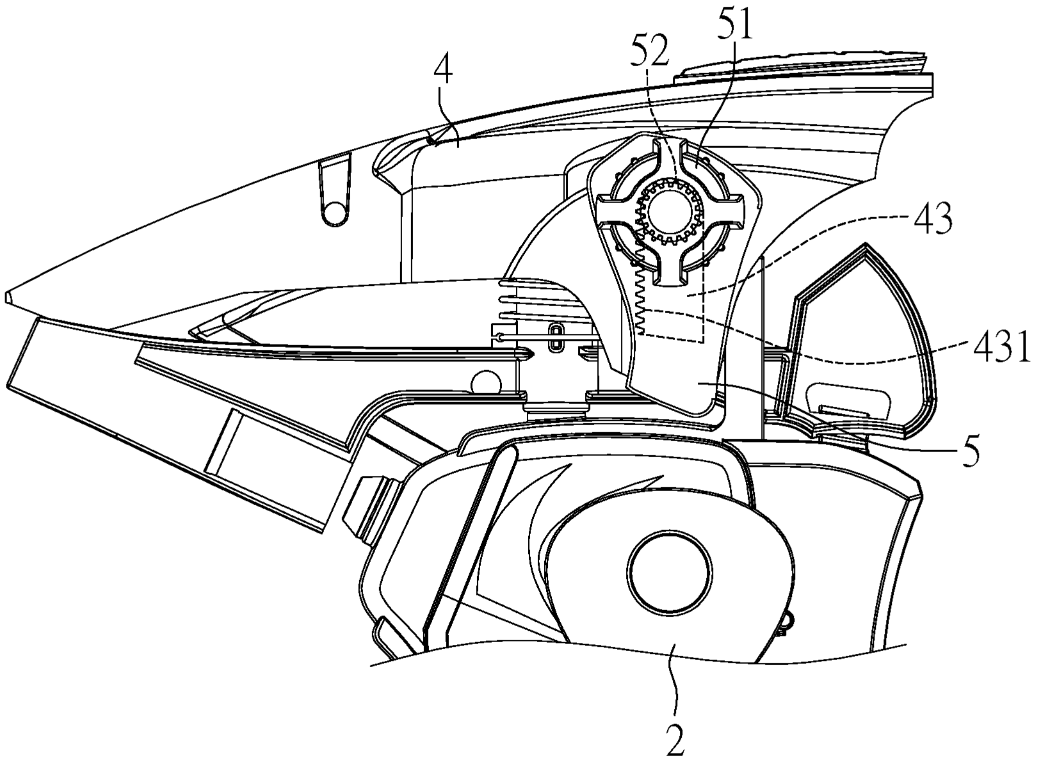
FIGS. 8 and 9 illustrate schematic operational views showing adjustments of a abutted member of the water sprinkler.
Figure 9:
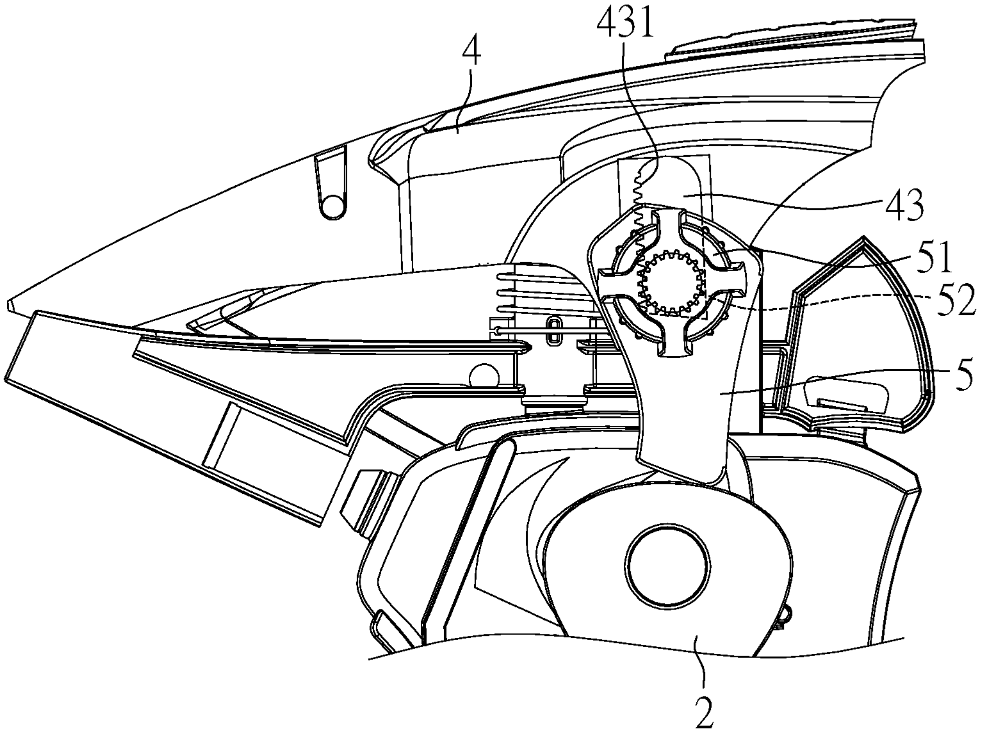

In addition, the position of the abutted member 5 can be changed to allow the minimum sprinkling range of the water sprinkler to be adjusted. In detail, in this embodiment, as shown in FIGS. 2 and 8, one side of the water baffling cover 4 has an elongate groove 43, and one side of the elongate groove 43 has a rack 431. The abutted member 5 pivots with a rotatable knob 51, a pinion 52 is extending toward the elongate groove 43 from the knob 51, and the pinion 52 is engaged with the rack 431. Based on the above, as shown in FIGS. 8 and 9, when the knob 51 is rotated, the knob 51 can be moved along the elongate groove 43 because of the engagement between the pinion 52 and the rack 431. Hence, the abutted member 5 is moved along with the movement of the knob 51, so that the relative position between the abutted member 5 and the cam 2 can be adjusted. Therefore, the cam 2 pushes the abutted member 5 by different extents. Accordingly, the maximum area of the shield portion 42 to shield the ejection head 12 is changed, and the minimum sprinkling range of the water sprinkler is changed as well.

Figure 10:
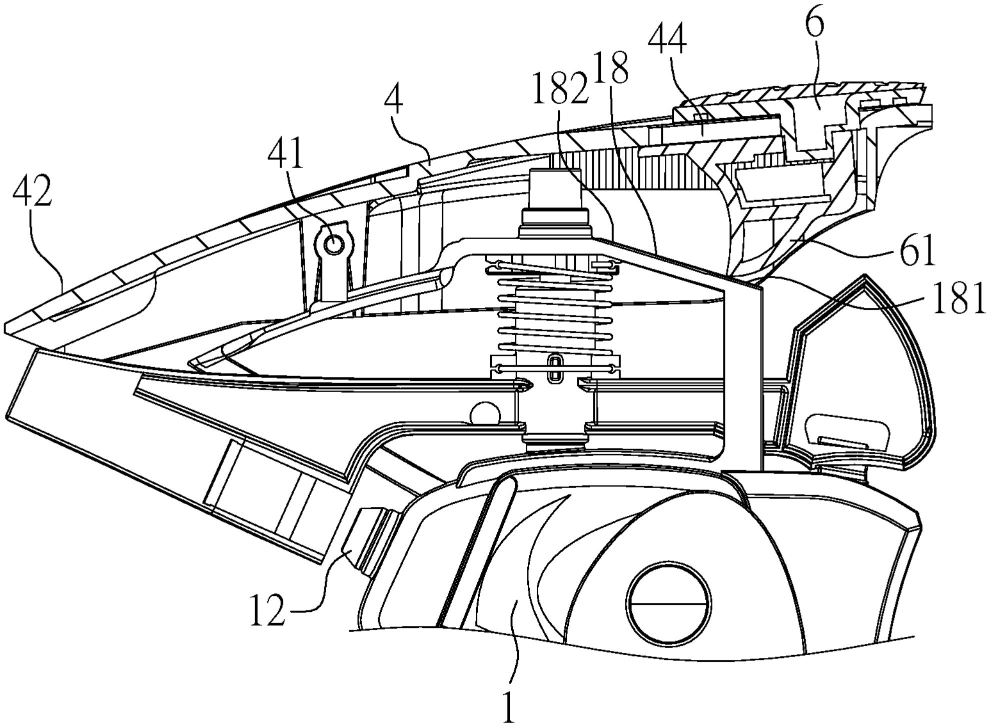
FIGS. 10 and 11 illustrate schematic view showing operations of a pushing block of the water sprinkler.
Figure 11:
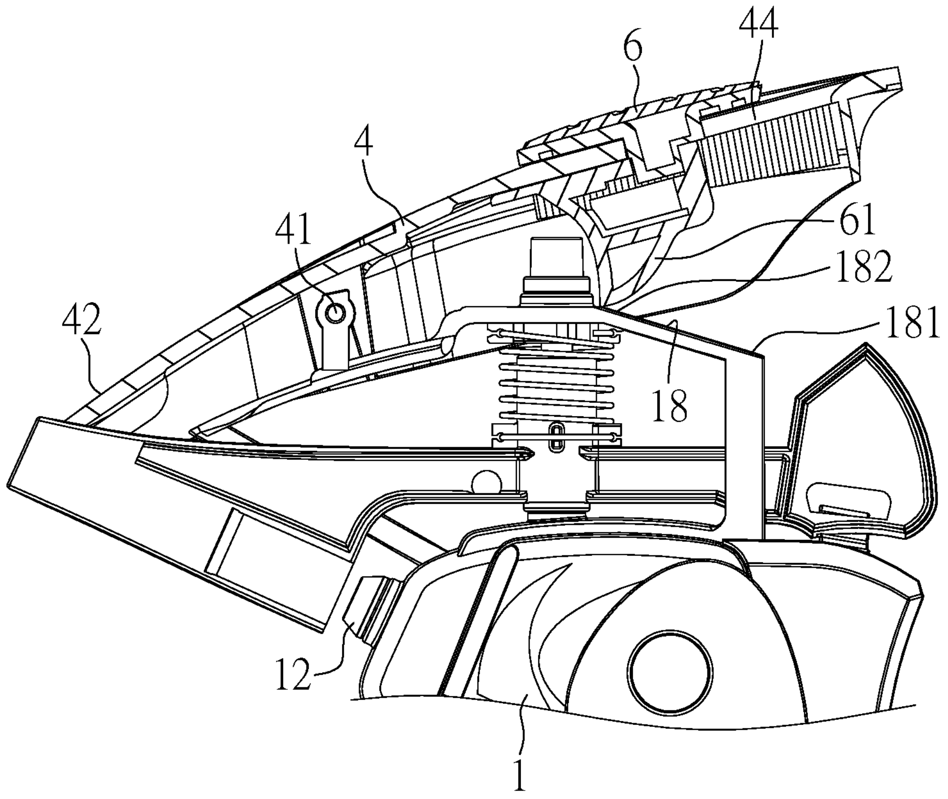

Furthermore, the water sprinkler further comprises a movable pushing block 6 to allow the maximized sprinkling range of the water sprinkler to be changed. As shown in FIG. 2, the pushing block 6 is assembled in a slot 44 of the water baffling cover 4. An abutting portion 61 is extending from the bottom of the pushing block 6 and abutted against an abutting surface 18 of the housing 1. The abutting surface 18 is not parallel with the surface of the water baffling cover 4. In other words, the distances between points at different positions of the slot 44 and the abutting surface 18 are different. As shown in FIG. 10, the abutting surface 18 is defined to have a first end 181 and a second end 182, and the distance between the first end 181 and the water baffling cover 4 is greater than the distance between the second end 182 and the water baffling cover 4. In this embodiment, the first end 181 and the second end 182 are respectively close to two ends of the slot 44. When a user tends to adjust the maximum sprinkling range of the water sprinkler, the pushing block 6 is pushed and moved along the slot 44, and the abutting portion 61 is moved between the first end 181 and the second end 182. Since the water baffling cover 4 is pivoted about the pivoting portion 41, the height of the shield portion 42 can be changed, as shown in FIGS. 10 and 11. Therefore, not only the maximum ejection distance of the ejection head 12 is changed, but also the sprinkling range of water sprinkler.

Furthermore, as shown in FIG. 2, one side of the slot 44 has a teeth rack portion 441, and the pushing block 6 comprises an abutting piece 62 corresponding to the teeth rack portion 441. When the pushing block 6 is assembled in the slot 44, the abutting piece 62 is abutted against the teeth rack portion 441 for positioning the pushing block 6.

What is claimed is:

1. A water sprinkler, comprising:

a housing comprising an inflow pipe for guiding water into the housing and an ejection head for ejecting water;

an impeller disposed in front of the inflow pipe in the housing for being driven to rotate by water, wherein the impeller is connected to a driving mechanism, and the driving mechanism is connected to a cam;

a water-hit target pivoted with the housing, wherein the water-frit target is connected to the housing via a compression spring, the water-hit target comprises an impacted portion extending to a front of the ejection head, wherein the water-hit target rotates due to an impact of water against the impacted portion while the water-hit target rotates reversely due to a pull acting on the impacted portion by the compression spring so as to hit the housing repeatedly for a rotation of the housing to change an ejecting direction of the water from the ejection head; and a water baffling cover pivoted with the housing by a pivoting portion, wherein the water baffling cover extends a shield portion to the front of the ejection head, wherein an abutted member is disposed on the water baffling cover to abut against the cam and is pushed by the cam to drive the water baffling cover to pivot with respect to the housing, so that a block extent of the ejection head performed by the shield portion is changed.

2. The water sprinkler according to claim 1, Wherein an elongate groove is opened on the water baffling cover, the abutted member comprises a controlling portion extending into the elongate groove, the controlling portion is controlled to move along the elongate groove to bring the abutted member to change a position relative to the cam.

3. The water sprinkler according to claim 2, wherein one side of the elongate groove has a rack, the controlling portion is a rotatable knob, and a pinion is extending from the knob to engage with the rack.

4. The water sprinkler according to claim 2, wherein the water baffling cover comprises a movable pushing block abutted against an abutting surface that is not parallel with the water baffling cover on the housing, and on the abutting surface a first end with a distance to the water baffling cover and a second end with a less distance to the water baffling cover are defined for the pushing block being movable therebetween.

5. The water sprinkler according to claim 1, further comprising:

a first room, a second room, and a third room divided from the housing by a first partition wall and a second partition wall, wherein the first partition wall has a first opening communicating the first room and the third room while the second partition wall has a second opening communicating the second room and the third room;

a baffling plate that is located in front of the second opening in the third room being connected by a connecting bar extending from the second room to the third room, which is through the second partition wall, wherein a spring is fitted over the connecting bar in the second room;

a first water inlet that is disposed opposite to the inflow pipe on the housing communicating with the first room; and a second water inlet that is disposed opposite to the inflow pipe on the housing communicating with the second room.

6. The water sprinkler according to claim 1, wherein the driving mechanism comprises a plurality of driving gears.

7. The water sprinkler according to claim 1, wherein the cam is assembled outside of the housing.

* * * * *